April 8, 1952      A. J. NERAD      2,592,322
ROCKET MOTOR PUMPED SUPERSONIC WIND TUNNEL
Filed Sept. 2, 1948
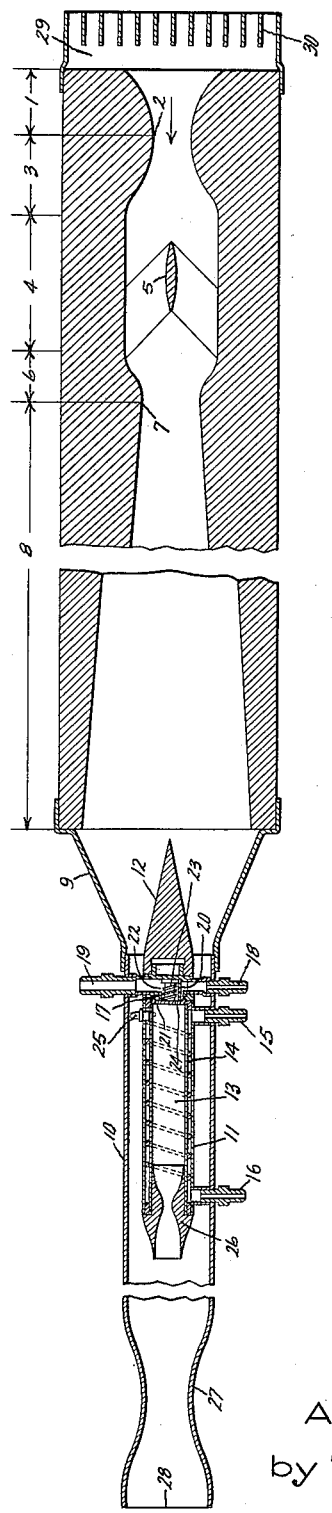
Inventor:
Anthony J. Nerad,
by Richard E. Hosley
His Attorney.

Patented Apr. 8, 1952

2,592,322

UNITED STATES PATENT OFFICE 2,592,322

ROCKET MOTOR PUMPED SUPERSONIC WIND TUNNEL

Anthony J. Nerad, Alplaus, N. Y., assignor to General Electric Company, a corporation of New York Application September 2, 1948, Serial No. 47,401

6 Claims. (Cl. 73—147)

This invention relates to an aerodynamic testing device known as a wind tunnel and more particularly to a supersonic wind tunnel and its operating power system.

The present trend in the aerodynamic art is to seek great velocities for aircraft and airborne projectiles. In the past it has been found that in order to correctly design the body configurations of the devices to be used in flight, it is necessary that extensive tests be performed upon the proposed body configurations to determine the aerodynamic characteristics of said configurations. Wind tunnels were devised for the purpose of providing a research instrument with which such tests could be performed. A wind tunnel consists of an enclosed channel in which air is made to flow at considerable velocities, thus simulating those conditions of flight being tested. A model of the device to be tested is mounted in the air stream and measurements are made of the aerodynamic characteristics of the model in the air stream. To induce the air flow, power means such as a propeller, or a compressor, or an exhauster, have been used.

The power expended in operating a wind tunnel depends upon the cross-sectional area of the wind tunnel test section, the velocity to be attained in the wind tunnel test section, the total pressure or density of the air, and the overall efficiency of the method of driving the wind tunnel. In order to achieve increasing velocities in a wind tunnel test section of a given cross-section area it is necessary to increase the power expended. In order to achieve a flow of air through a wind tunnel, a pressure differential along the direction of flow of the air must exist. The purpose of the power system of a wind tunnel is to create the necessary pressure differential in the flow channel. In subsonic wind tunnels, as the pressure drop (or differential) is increased the maximum velocity attained in the test section of the tunnel increases although the increase in power consumed is not related in a simple ratio to the velocity attained.

As the velocity increases in the test section of a subsonic wind tunnel the mass flow per unit of time through the tunnel's smallest cross-section area, the test section, also increases. Although the density of the air passing through the test section decreases as the subsonic velocity increases, the decrease is not rapid enough to change the trend of increase in mass flow with increase in velocity. At a Mach number of 1, however, the decrease in density with the increase in velocity is so related that a maximum mass flow per unit of time occurs. Since the maximum mass flow occurs at a Mach number equal to 1, and since this Mach number equal to 1 will be attained at the minimum cross-sectional area of the wind tunnel immediately downstream of the subsonic flow region in the tunnel, this minimum cross-sectional area or throat is said to be choking, and the mass flow passing through this throat is called the choking mass flow of the tunnel. The maximum mass flow must occur at the minimum cross section, or throat, in order to satisfy the law of continuity.

In order to obtain supersonic velocity in a wind tunnel, it is necessary that a Mach number of 1 be attained at the section immediately upstream of the supersonic region of the wind tunnel. Once a Mach number of 1 is attained at a throat the type of flow downstream of the throat is a function of the expansion contour of the tunnel and the pressure differential. Therefore, the minimum power required to achieve supersonic flow in a channel is that power necessary to achieve choking of the mass flow at the point of smallest cross-section area in the channel, the throat. Since in a subsonic wind tunnel choking is avoided, the power demands of a supersonic wind tunnel will be greater than the power demands of any subsonic wind tunnel of the same throat size because the maximum mass flow occurs in the supersonic wind tunnel.

The standard equipment required to force air through a supersonic wind tunnel or induce flow in such a wind tunnel usually consists of an electric motor and appropriate additional electric equipment plus a fan and means for mounting said fan; or may consist of an exhauster, a motor for driving the exhauster, a surge tank, and the necessary piping and valving adjunct thereto; or a compressor, a motor for driving the compressor, surge tank, piping, and valves; or steamboilers and a steam ejector system. This equipment has a high initial cost and the installation is usually permanent, bulky, and expensive to operate. Also, because of breakdowns, the necessity of installing new models, servicing the expensive motive power machines, and instrumentation of models and equipment, the possible operating time for a supersonic wind tunnel is notoriously low. Thus the equipment, because of intermittent use, remains for a large period of time unproductive and represents a costly capital expenditure.

One of the objects of this invention is to provide a power means for a supersonic wind tunnel which is compact, easily handled, inexpensive to operate, of small initial cost, expendable, and easily serviced.

Another object is to provide an adequate power means for supplying the power required to operate a supersonic wind tunnel.

A further object is to provide a supersonic wind tunnel system that could be operated in areas where large electromotive resources are not available.

Another object is to provide a system that will operate as an improved and large capacity air ejector.

Further objects and advantages of my invention will become apparent as the following description proceeds and the features of novelty which characterize my invention will be pointed out with particularity in the claims annexed to and forming a part of this specification.

In the drawing is shown one embodiment of the invention useful for the study and observation of the behavior of aerodynamic devices under supersonic velocities.

In the drawing, the wind tunnel or fluid flow channel is shown as comprising a faired inlet section 1 having a contour designed according to well known theory in the art so as to achieve an orderly flow of air to the throat 2 at which a Mach number of 1 is attained by the incoming air. The expansion section 3 of the wind tunnel downstream of the throat 2 are designed according to the well known Prandtl-Busemann theory for the expansion of supersonic flow. The walls of the test section 4 of the tunnel are parallel and are located downstream of the supersonic expansion section 3. In test section 4, steady state parallel supersonic flow exists. A model 5 is shown mounted in the test section flow. Progressing downstream, the next section in the supersonic wind tunnel is the supersonic compressing section 6 which also is designed according to the Prandtl-Busemann theory. The supersonic compressing section 6 leads to the second throat 7 which is provided for the purpose of fixing supersonic flow in the entire region bounded by the first throat 2 and the second throat 7. The second throat 7 is designed to have the minimum cross-sectional area consistent with obtaining steady supersonic flow ahead of it. After the second throat the walls of the tunnel diverge forming a straight taper subsonic diffuser 8. The flow is converted to subsonic flow by means of shock waves located downstream of second throat 7.

The flow in the subsonic diffuser section 8 is ducted by transition section 9 to a section of the tunnel called the motor section 10, wherein is located the rocket motor 11. Rocket motor 11 has a faired streamlined cone 12 mounted on the upstream end for the purpose of reducing the drag of the rocket motor assembly.

The rocket motor itself consists of two chambers, an inner chamber 13 for combustion and an outer surrounding chamber 14 which is more specifically a coolant jacket through which is circulated a fluid for the purposes of cooling the combustion chamber wall. A coolant inlet 15 is provided at one end of the water jacket and an outlet 16 is provided at the other end of the coolant jacket.

Inserted in the combustion chamber at the upstream end is a combustion head 17 provided with a fluid inlet port 18 for liquid oxygen and another fluid inlet port 19 for the liquid fuel. Port 18 leads to chamber 20 which communicates with spray outlets 21 which are shown as holes in the face of combustion head 17. Port 19 leads to chamber 22 within which is mounted a spinner 23. Chamber 22 also has spray outlets 24 which are shown as holes in the face of combustion head 17. The spray outlets 21 and 24 are at such an angle that the sprays issuing from them are impinging and give the greatest possible mixing of fuel and oxygen. Inserted through the walls of the coolant jacket 14 is a spark plug 25 for initiating combustion in the combustion chamber. Attached to the downstream end of the combustion chamber is a converging-diverging nozzle 26 for directing the exhaust velocity of the products of combustion. The portion of the wind tunnel downstream of the combustion chamber nozzle 26 is called the mixing tube and is designated 27. It is in this tube that the exhausting gases from the rocket motor entrains the air in the wind tunnel and exhausts this air, thus creating the pressure differential necessary to cause the air to flow through the wind tunnel. The pressure differential is changed by varying the amount of air that is entrained and exhausted per unit of time and this in turn is determined by the velocity and mass of the products of combustion issuing from the rocket motor.

Since the starting power requirements of a supersonic wind tunnel are the maximum power requirements, the mixing tube should be designed to provide for this critical point. Thus, the mixing tube 27 is designed to provide the pressure differential required at the nozzle exit to start the supersonic wind tunnel and in addition to entrain the maximum possible airflow thru the tunnel. For a given size rocket power plant, the mixing tube design will depend on the supersonic velocity to be reached in the wind tunnel test section. Generally the mixing tube is in the form of a converging-diverging tube as shown.

Also shown in the drawing is a means, upstream of inlet section 1 of the wind tunnel, for drying the incoming air. These means are represented as a screen 29 having grids 30 coated with a moisture absorbent material such as silica gel.

In the operation of the wind tunnel, the rocket motor 11 is started up. The exhaust gases entrain the air downstream of the combustion chamber nozzle exit and eject the air through the mixing tube exit 28. This provides a pressure differential between the inlet and the outlet of the wind tunnel which causes the air to flow. The flow of air brings more air into the mixing tube 27 where it is entrained and exhausted thus providing a continuous flow through the tunnel. The incoming air is dehydrated by the silica gel for the purpose of eliminating condensation shocks in the tunnel. This is well known in the art. Then the incoming air is accelerated in inlet section 1 until choking occurs at throat 2 at which time the Mach number is equal to 1 at the throat 2 and supersonic flow is established in the region immediately downstream of the throat. After supersonic flow is initially established, the problem of whether the entire flow in the channel between the first throat 2 and the second throat 7 will be supersonic is only a function of the exhaust pressure. The exhaust pressure in turn is a function of the amount of ejecting that the rocket motor is performing. The ejection rate itself is dependent upon the mass and speed of the ejector gas. To increase the mass of the ejector gas, water is introduced into the combustion chamber and emerges from the nozzle as superheated steam admixed with the other gas products of combustion. The water may be introduced mixed with the fuel (if the fuel is alcohol) or may be separately sprayed in the combustion chamber where the tremendous heat changes its form to superheated steam. The use of water has three advantages. One, it reduces the amount of fuel needed for a certain desired rate of ejection, thus resulting in fuel economy. Second, it provides a greater specific ejector fluid mass than any hydrocarbon fuel does, resulting in further fuel economy. Three, it provides a cooling agent, thus permitting the use of cheaper materials of construction of the rocket motor, and resulting in greater safety and longer operating life of the motor.

Thus, by supplying the correct quantities of combustion material to the rocket motor, supersonic flow is induced all the way through the wind tunnel past the second throat. After supersonic flow is established past the second throat, the power consumption may be reduced to a lower value as is well known in the art.

It will be understood that while the device is described as operating particularly at supersonic velocities, nevertheless, the same principles may be applied for operation at subsonic velocities. Moreover, while the flow channel indicated in the drawing has been shown as of the open type, that is open continually to the atmosphere, nevertheless, it might be found advantageous in certain installations to employ one having a semi-closed fluid circuit. In this case a quantity of air within the chamber would be used over and over again in continually circulating fashion. This sort of system would have the advantage that a greater range of pressures could be controllably developed. A semi-closed system is operable in which part of the air and combustion gas is exhausted and fresh make-up air is supplied.

It will be further understood that the power means represented by rocket motor 11 may be constructed as a plurality of cooperating rocket motors, the number depending upon the amount of power desired or required. It should also be apparent to one skilled in the art that a system combining a compressor at the upstream end of a supersonic wind tunnel and a rocket motor ejector system at the downstream end of the wind tunnel will give an even greater range of possible pressure differentials.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A supersonic wind tunnel comprising, progressing downstream from the inlet, a throat, a supersonic expansion section, a test section, and a section wherein is mounted a power means whereby fluid flow is induced in said supersonic wind tunnel, said power means comprising a reaction motor positioned within the path of fluid flow through said wind tunnel, and a mixing tube section comprising a converging-diverging nozzle wherein the exhausting products of combustion escaping from said reaction motor entrains and ejects the fluid within the wind tunnel causing flow of fluid through the wind tunnel.

2. A supersonic wind tunnel system comprising a contoured wall section having an upstream and a downstream end, said contoured wall bounding a flow channel comprising, in order progressing toward the downstream end, an inlet section, a first throat, a supersonic expansion section, a test section, a supersonic compression section, a second throat, and a diffusing section, a section wherein is mounted a power means whereby fluid flow is induced in said supersonic wind tunnel, said power means comprising a reaction motor positioned within the path of fluid flow through said wind tunnel, and a mixing tube section downstream of said reaction motor comprising a converging-diverging nozzle wherein the exhausting products of combustion issuing from said reaction motor entrains and ejects the fluid within the wind tunnel causing flow of fluid through the wind tunnel system.

3. A supersonic wind tunnel comprising, progressing downstream from the inlet, a throat, a supersonic expansion section, a test section, a section wherein is mounted a power means whereby fluid flow is induced in said supersonic wind tunnel, said power means comprising a reaction motor positioned within the path of fluid flow through said wind tunnel, and a mixing tube section downstream of said reaction motor comprising a converging-diverging nozzle wherein the exhausting products of combustion issuing from said reaction motor entrains and ejects the fluid within said tunnel causing flow of fluid through the wind tunnel.

4. A supersonic wind tunnel comprising, progressing downstream from the inlet, a throat, a supersonic expansion section, a test section, entraining and ejecting means for producing fluid flow through the wind tunnel comprising a combustion chamber and a nozzle mounted and positioned within the path of fluid flow so that the nozzle directs a high speed ejecting fluid issuing from the combustion chamber in a downstream direction, and a mixing tube downstream of said combustion chamber comprising a converging-diverging nozzle wherein the ejecting fluid entrains and ejects the fluid in the wind tunnel causing flow of fluid through the wind tunnel.

5. A supersonic wind tunnel system comprising a contoured wall section having an upstream and a downstream end, said contoured wall forming a fluid flow channel comprising, in order progressing toward the downstream end, an inlet section, a first throat, a supersonic expansion section, a test section, a supersonic compression section, a second throat, and a diffusing section, entraining and ejecting means located downstream of said contoured wall section for producing fluid flow through the wind tunnel comprising a shell which is fastened to the downstream end of said contoured wall section and which bounds a fluid flow channel which is the downstream extension of the fluid flow channel formed by said contoured wall section, a combustion chamber and a nozzle mounted within said shell and positioned within the path of fluid flow so that the nozzle directs in a downstream direction a high velocity ejecting fluid which issues from the combustion chamber.

6. A supersonic wind tunnel system comprising a contoured wall section having an upstream and a downstream end, said contoured wall forming a fluid flow channel comprising, in order progressing toward the downstream end, an inlet section, a first throat, a supersonic expansion section, a test section, a supersonic compression section, a second throat, and a diffusing section, entraining and ejecting means located downstream of said contoured wall section for producing fluid flow through the wind tunnel comprising a shell which is fastened to the downstream end of said contoured wall section and which bounds a fluid flow channel which is the downstream extension of the fluid flow channel formed by said contoured wall section, a combustion chamber and a nozzle mounted within said shell and positioned within the path of fluid flow so that the nozzle directs in a downstream direction a high velocity ejecting fluid which issues from the combustion chamber, and a mixing tube downstream of said combustion chamber comprising a converging-diverging nozzle bounding the fluid flow channel wherein the high velocity ejecting fluid entrains and ejects the fluid lying in the fluid flow channel causing flow of fluid through the entire fluid flow channel.

ANTHONY J. NERAD.

REFERENCES CITED

The following references are of record in the file of this patent:

UNITED STATES PATENTS

| Number | Name | Date |
| --- | --- | --- |
| 1,773,051 | Marenti | Aug. 12, 1930 |
| 2,472,949 | Jackson | June 14, 1949 |
| 2,515,069 | Zola | July 11, 1950 |

FOREIGN PATENTS

| Number | Country | Date |
| --- | --- | --- |
| 470,238 | Germany | Jan. 9, 1929 |